(12) United States Patent  (10) Patent No.: US 8,066,821 B2
Hedstrom et al.  (45) Date of Patent: Nov. 29, 2011

(54) SYSTEM FOR LIMITING PRESSURE IN A FINE FILTER CHAMBER FOR A DISHWASHER

(75) Inventors: Kristen K. Hedstrom, Orlando, FL (US); Mark E. Palm, Orlando, FL (US); Rodney M. Welch, Jackson, TN (US)

(73) Assignee: Whirlpool Corporation, Benton Harbor, MI (US)

( * ) Notice: Subject to any disclaimer, the term of this patent is extended or adjusted under 35 U.S.C. 154(b) by 2006 days.

(21) Appl. No.: 11/052,893

(22) Filed: Feb. 9, 2005

(65) Prior Publication Data

US 2006/0174916 A1 Aug. 10, 2006

(51) Int. Cl.
*B08B 3/00* (2006.01)
(52) U.S. Cl. .................... 134/56 D; 134/57 D; 134/58 D
(58) Field of Classification Search .................. None
See application file for complete search history.

(56) References Cited

U.S. PATENT DOCUMENTS

| | | | |
|---|---|---|---|
| 3,049,132 A * | 8/1962 | Gilson | 134/57 D |
| 3,896,827 A * | 7/1975 | Robinson | 134/10 |
| 4,285,390 A | 8/1981 | Fortune et al. | |
| 4,392,891 A | 7/1983 | Meyers | |
| 4,559,959 A | 12/1985 | Meyers | |
| 5,097,855 A | 3/1992 | Martinsson et al. | |
| 5,165,433 A | 11/1992 | Meyers | |
| 5,320,120 A | 6/1994 | Hoffman et al. | |
| 5,333,631 A | 8/1994 | Kirkland et al. | |
| 5,345,957 A | 9/1994 | Cooper et al. | |
| 5,377,707 A | 1/1995 | Young, Jr. | |
| 5,433,228 A | 7/1995 | Dingler | |
| 5,433,232 A | 7/1995 | Young, Jr. | |
| 5,601,660 A | 2/1997 | Jeon et al. | |
| 5,628,334 A | 5/1997 | Edwards et al. | |
| 5,700,329 A | 12/1997 | Edwards et al. | |
| 5,762,080 A | 6/1998 | Edwards et al. | |
| 5,803,100 A | 9/1998 | Thies | |
| 5,848,601 A | 12/1998 | Thies | |
| 5,909,743 A | 6/1999 | Thies et al. | |
| 6,103,017 A | 8/2000 | Thies et al. | |
| 6,182,674 B1 | 2/2001 | Jozwiak et al. | |
| 6,234,184 B1 | 5/2001 | Tuller et al. | |
| 6,418,943 B1 | 7/2002 | Miller | |

(Continued)

FOREIGN PATENT DOCUMENTS

EP 842632 5/1998

*Primary Examiner* — Michael Kornakov
*Assistant Examiner* — Eric Golightly
(74) *Attorney, Agent, or Firm* — Robert A. Bacon; Diederiks & Whitelaw, PLC

(57) ABSTRACT

A dishwasher includes wash chamber, a wash system for supplying washing fluid to wash arms to clean articles arranged in the wash chamber, and a washing fluid manifold having an inlet portion, an outlet portion and a passage interconnecting the inlet and outlet portions. A filter chamber is fluidly connected to the washing fluid manifold for removing food soil from the washing fluid. A venturi is provided in the passage for establishing a low pressure region. A sampling port for feeding the filter chamber is located in the low pressure region. In addition, a bleed port is provide near an inlet of the filter chamber. In this manner, washing fluid enters the filter chamber at low pressure to increase the efficiency of a filtering process, while washing fluid enters the wash arms at a high velocity to efficiently perform a washing operation.

12 Claims, 9 Drawing Sheets

U.S. PATENT DOCUMENTS

| | | |
|---|---|---|
| 6,432,216 B1 | 8/2002 | Thies |
| RE37,831 E | 9/2002 | Thies |
| 6,454,872 B1 | 9/2002 | Miller et al. |
| 6,460,555 B1 | 10/2002 | Tuller et al. |
| 6,491,049 B1 | 12/2002 | Tuller et al. |
| 6,605,157 B2 | 8/2003 | Hegeman |
| 6,615,853 B2 | 9/2003 | Hegeman et al. |
| 6,641,058 B2 | 11/2003 | Hegeman et al. |
| 6,698,438 B2 | 3/2004 | Hegeman et al. |
| 6,811,617 B2 | 11/2004 | Elick et al. |
| 2003/0029478 A1 | 2/2003 | Hegeman |
| 2003/0029781 A1 | 2/2003 | Hegeman et al. |
| 2003/0037809 A1 | 2/2003 | Favaro |
| 2003/0136931 A1 | 7/2003 | Watanabe et al. |
| 2004/0003883 A1 | 1/2004 | Kiuchi et al. |
| 2004/0045586 A1 | 3/2004 | Rappete |
| 2004/0103927 A1 | 6/2004 | Ha |
| 2004/0250837 A1 | 12/2004 | Watson et al. |
| 2006/0174916 A1 | 8/2006 | Hedstrom et al. |

\* cited by examiner

SYSTEM FOR LIMITING PRESSURE IN A FINE FILTER CHAMBER FOR A DISHWASHER

BACKGROUND OF THE INVENTION

1. Field of the Invention

The present invention pertains to the art of dishwashers and, more particularly, to a system for limiting pressure in a filter chamber in a dishwasher.

2. Discussion of the Prior Art

A typical dishwasher includes a closed system where washing fluid is pumped from a sump into upper and lower wash arms such that kitchenware retained on vertically spaced racks within a tub of the dishwasher will be sprayed with the washing fluid for cleaning purposes. The washing fluid is heated, filtered and recirculated. Prior to recirculating the washing fluid, the fluid is directed through one or more filters to remove soil from the fluid, with the soil being collected in a chamber. Periodically, the system is purged in order to drain the collection chamber of the soil.

In general, washing fluid is circulated in the system at a relatively high pressure in order to ensure an adequate fluid supply to the upper and lower wash arms. At some point in the system, washing fluid is passed or diverted into a filter chamber, often at the same, relatively high pressure that is supplied to the wash arms. Unfortunately, supplying the filter at high pressure will often reduce the overall efficiency of the filtering process. When operating at high pressure, the filter becomes clogged quickly, causing food soils to be released back into the wash system to circulate with the washing fluid. Without proper filtration, the level of food soils circulating in the washing fluid will rise, resulting in a decrease in the overall efficiency of the washing operation.

Based on the above, there exists a need for a system to limit pressure in a filter chamber of a dishwasher. More specifically, there exists a need for a system that minimizes the pressure of washing fluid entering the filter chamber while, at the same time, ensuring proper operation of the wash arms.

SUMMARY OF THE INVENTION

The present invention is directed to a dishwasher including a tub having top, bottom, rear and opposing side walls that collectively define a wash chamber. In a manner known in the art, the dishwasher is provided with a wash pump for establishing a flow of washing fluid in the wash chamber and a drain pump for selectively withdrawing washing fluid from the wash chamber during portions of a washing operation. In addition, the dishwasher includes a washing fluid manifold having an inlet portion for receiving the flow of washing fluid, an outlet portion that directs the flow of washing fluid upward into the wash chamber and a passage interconnecting the inlet and the outlet portions. A filter chamber is fluidly connected to the washing fluid manifold for removing fool soil and other debris from the washing fluid. The filter chamber includes an inlet for receiving washing fluid flowing through the manifold and an outlet that leads back into the wash chamber.

In accordance with the invention, a venturi is arranged in the passage interconnecting the inlet and outlet portions of the washing fluid manifold. With this arrangement, the flow of washing fluid passing through the venturi increases in velocity, while at the same time decreasing in pressure. In this manner, the venturi establishes a low pressure zone in the passage. In accordance with a preferred embodiment of the invention, a sampling port is provided in the low pressure zone portion of the passage. The sampling port enables a portion of the washing fluid, flowing through the passage, to be diverted into the filter chamber.

In accordance with the most preferred embodiment of the invention, in addition to the venturi, a bleed port is located proximate to the inlet of the filter chamber. The location and size of the bleed port serves to further reduce the pressure of the washing fluid entering the filter chamber. With this arrangement, the pressure of the washing fluid entering the filter chamber can remain low for efficient filter operation while, at the same time, the velocity of the washing fluid that is supplied to the wash arms is held high for efficient cleaning purposes.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
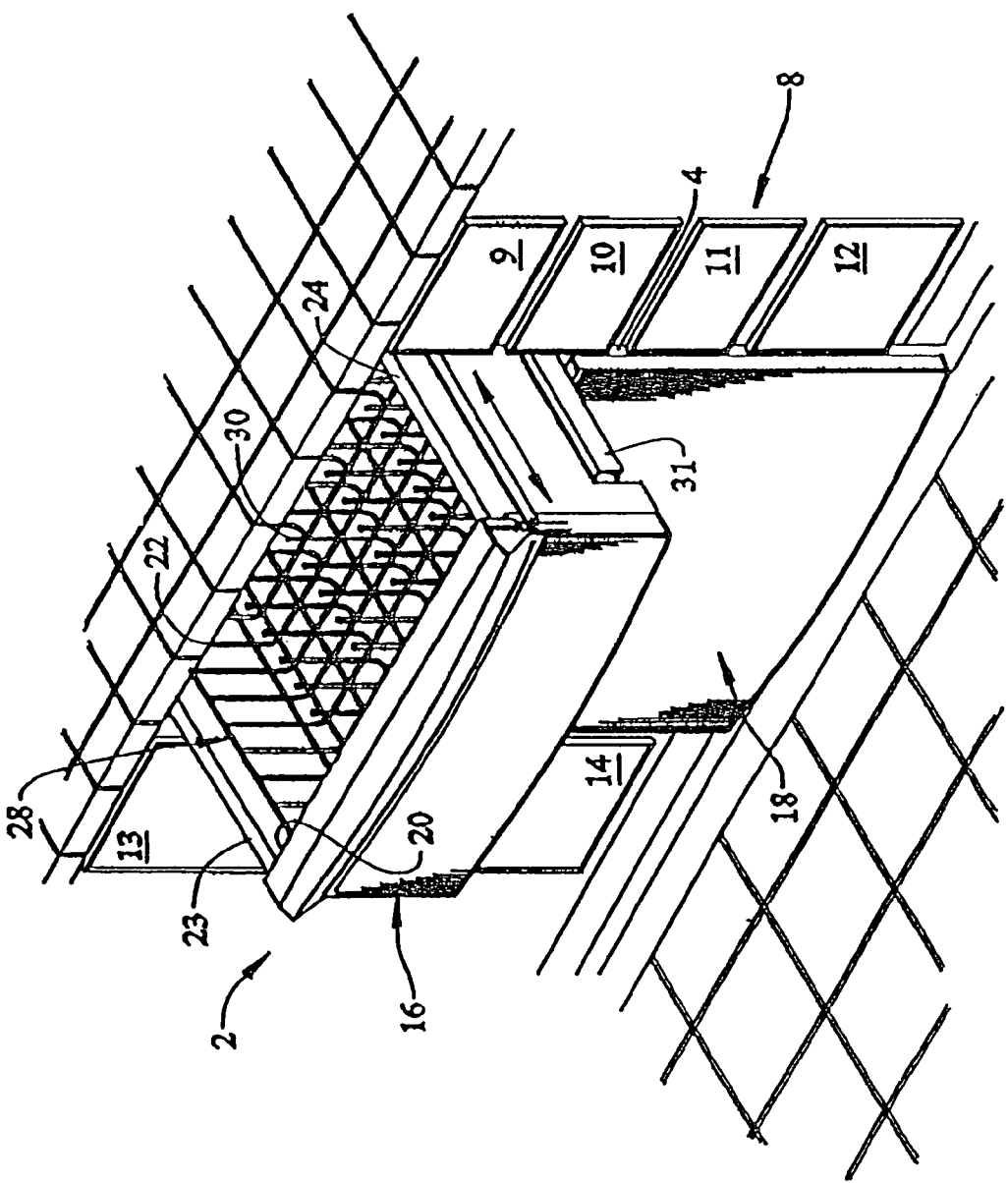
FIG. 1 is an upper right perspective view of a drawer-type dishwasher incorporating a pump and filter system employing the pressure limiting system of the present invention.
Figure 2:
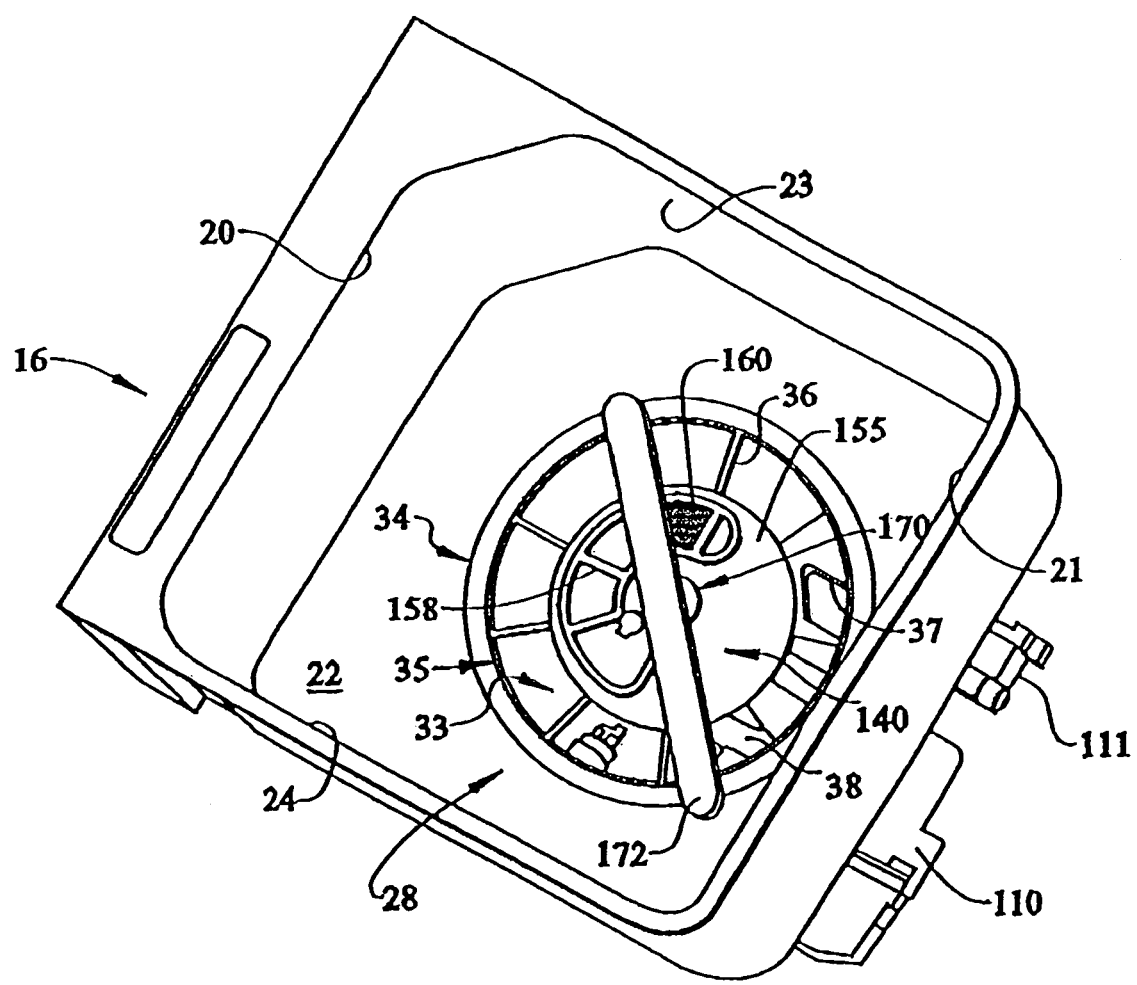
FIG. 2 is an upper perspective view of a washing tub of the dishwasher of FIG. 1.

With initial reference to FIGS. 1 and 2, a dishwasher constructed in accordance with the present invention is generally indicated at 2. As shown, dishwasher 2 includes a support frame 4 arranged below a kitchen countertop 6. Also below kitchen countertop 6 is shown cabinetry 8 including a plurality of drawers 9-12, as well as cabinet doors 13 and 14. Although the actual dishwasher into which the present invention may be incorporated can vary, the invention is shown in connection with dishwasher 2 depicted as a dual cavity dishwasher having an upper drawer 16 and a lower drawer 18. As best illustrated in FIG. 1, upper drawer 16 takes the form of a slide-out drawer unit having a small or medium capacity so as to be used for cleaning glassware and the like, while lower drawer 18 is illustrated as a larger capacity drawer for washing items such as dinnerware, cookware and other large sized objects. Of course, upper and lower drawers 16 and 18 could also be similar in size.

Upper drawer 16 is shown to include a front wall 20, a rear wall 21, a bottom wall 22 as well as opposing side walls 23 and 24 that collectively define an upper washing tub 28. Upper washing tub 28 is provided with a dish rack 30 for supporting various objects, such as glassware, utensils and the like, to be exposed to a washing operation. Upper washing tub 16 is slidingly supported within support frame 4 through a pair of extendible drawer support guides, one of which is indicated at 31. In the embodiment shown, bottom wall 22 actually forms part of a sump 33 that, as will be discussed more fully below, manages a flow of washing fluid within drawer 16.

Figure 3:
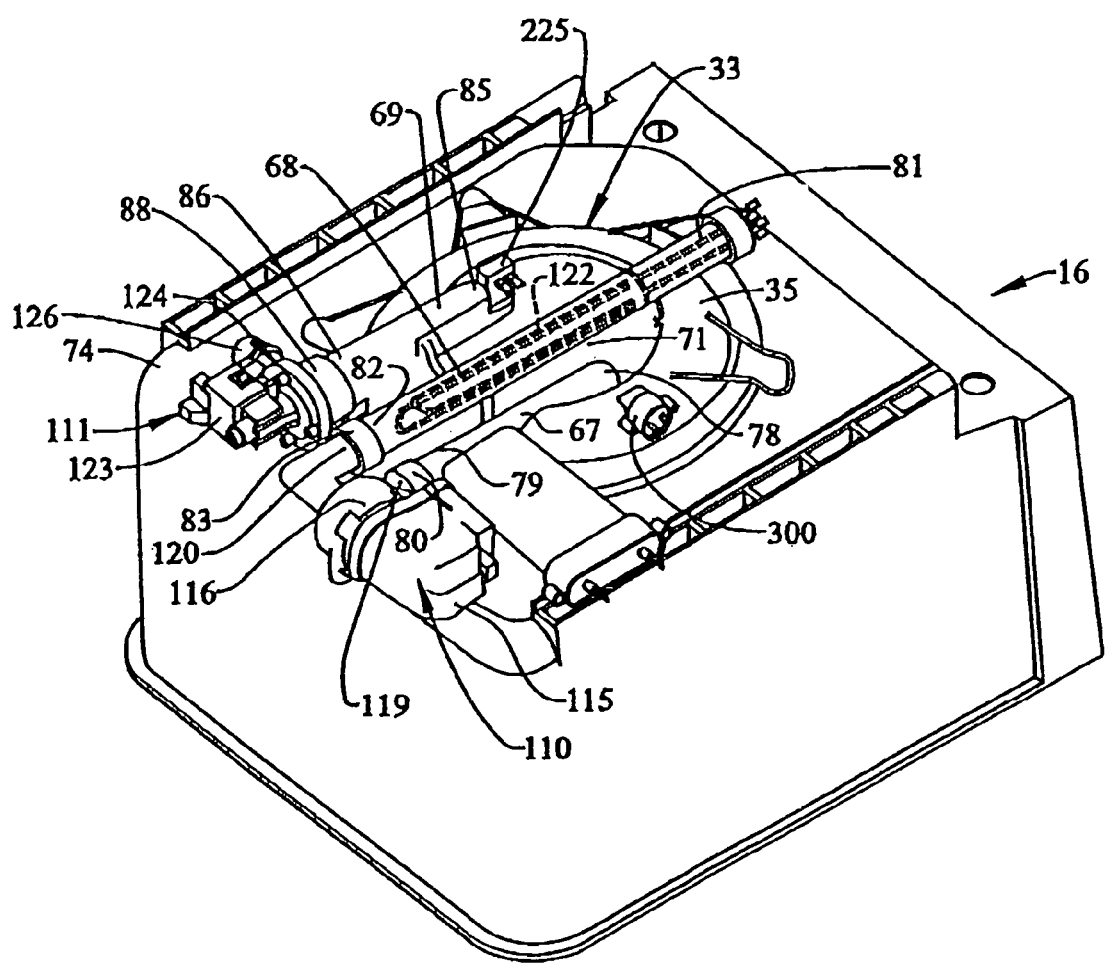
FIG. 3 is a lower perspective view of the washing tub of FIG. 2, illustrating portions of the pump and filter system of FIG. 1.
Figure 4:
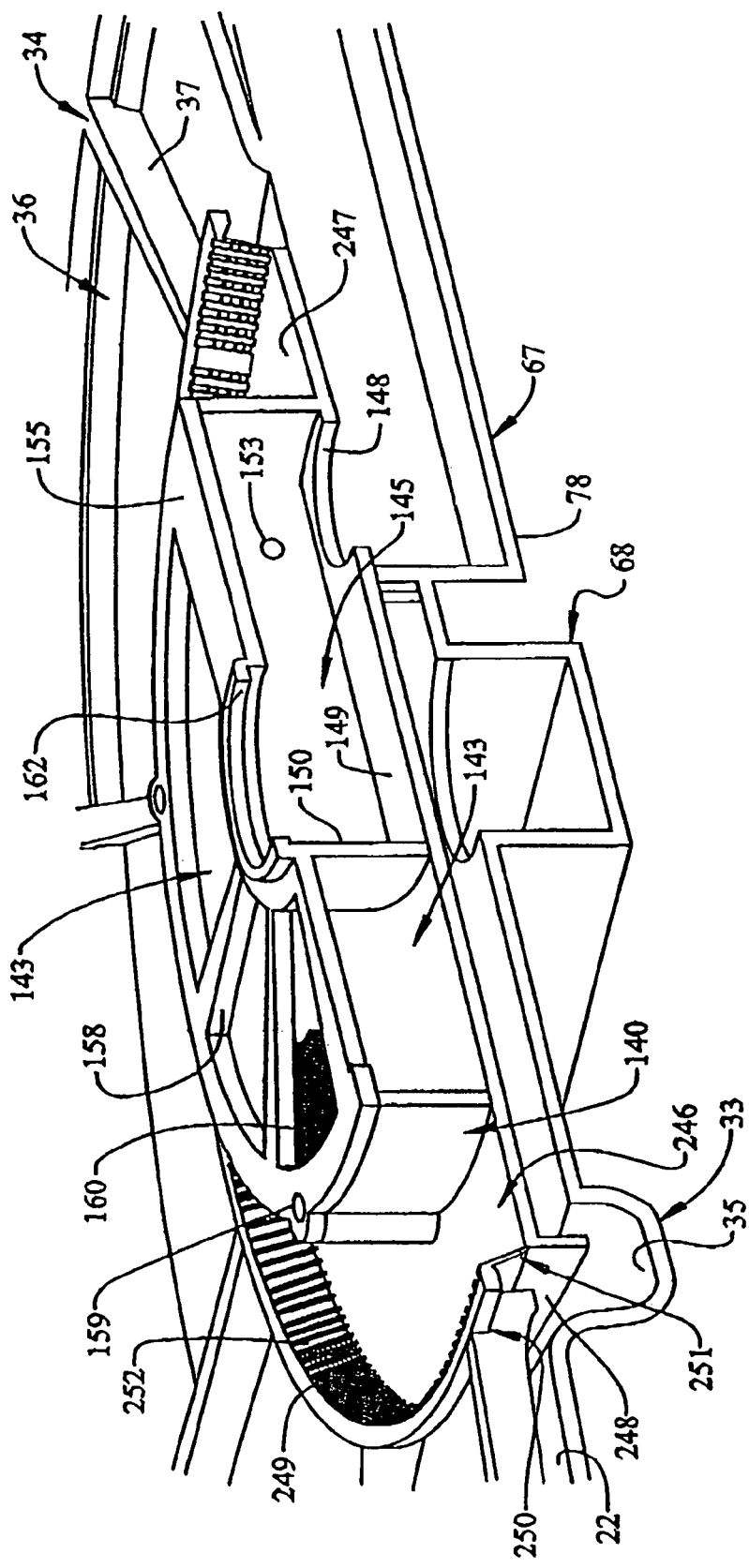
FIG. 4 is a partial, cross-sectional view taken along a bottom wall portion of the washing tub of the present invention.

As best shown in FIGS. 2-4, bottom wall 22 is provided with a recessed portion 34 having a generally U-shaped cross section defining an intake ring 35. A coarse particle strainer 36 extends about recessed portion 34 to trap/prevent large articles, such as utensils, bones and the like, from entering sump 33. Toward that end, coarse particle strainer 36 is includes a plurality of openings, one of which is indicated at 37, provided with a coarse filter screen (not shown) formed from, for example, a polyester mesh, plastic or stainless steel. Coarse particle strainer 36 traps larger objects that are collected in a coarse particle collection chamber 38, while allowing other particles to enter into sump 33.

Referring to FIG. 3, sump 33 includes a plurality of fluid conduits 67-69 formed along bottom wall 22 of washing tub 28. Alternatively, conduits 67-69 could be detachably secured to bottom wall 22. In any event, fluid conduit 67 constitutes a wash fluid supply conduit, fluid conduit 68 constitutes a wash fluid recirculation conduit and fluid conduit 69 constitutes a wash fluid drain conduit. Each of fluid conduits 67-69 provides wash fluid flow management during a washing operation. Preferably, fluid conduits 67-69 are spaced from, and arranged substantially parallel to, one another on bottom wall 22, with conduits 67 and 69 extending from a central portion 71 of intake ring 35 to an outer edge portion 74 of washing tub 28. More specifically, supply conduit 67 includes a first end 78 which is in fluid communication with an interior portion of washing tub 28 and leads to a second end 79. Second end 79 is provided with an attachment flange 80. Likewise, recirculation conduit 68 extends from a first end 81, which extends beyond intake ring 35 toward a front portion of drawer 16 to a second end 82. In a manner corresponding to supply conduit 67, recirculation conduit 68 is provided with a corresponding attachment flange 83. Finally, drain conduit 69 extends from a first end 85 to a second end 86 which is also provided with an attachment flange 88.

Figure 6:
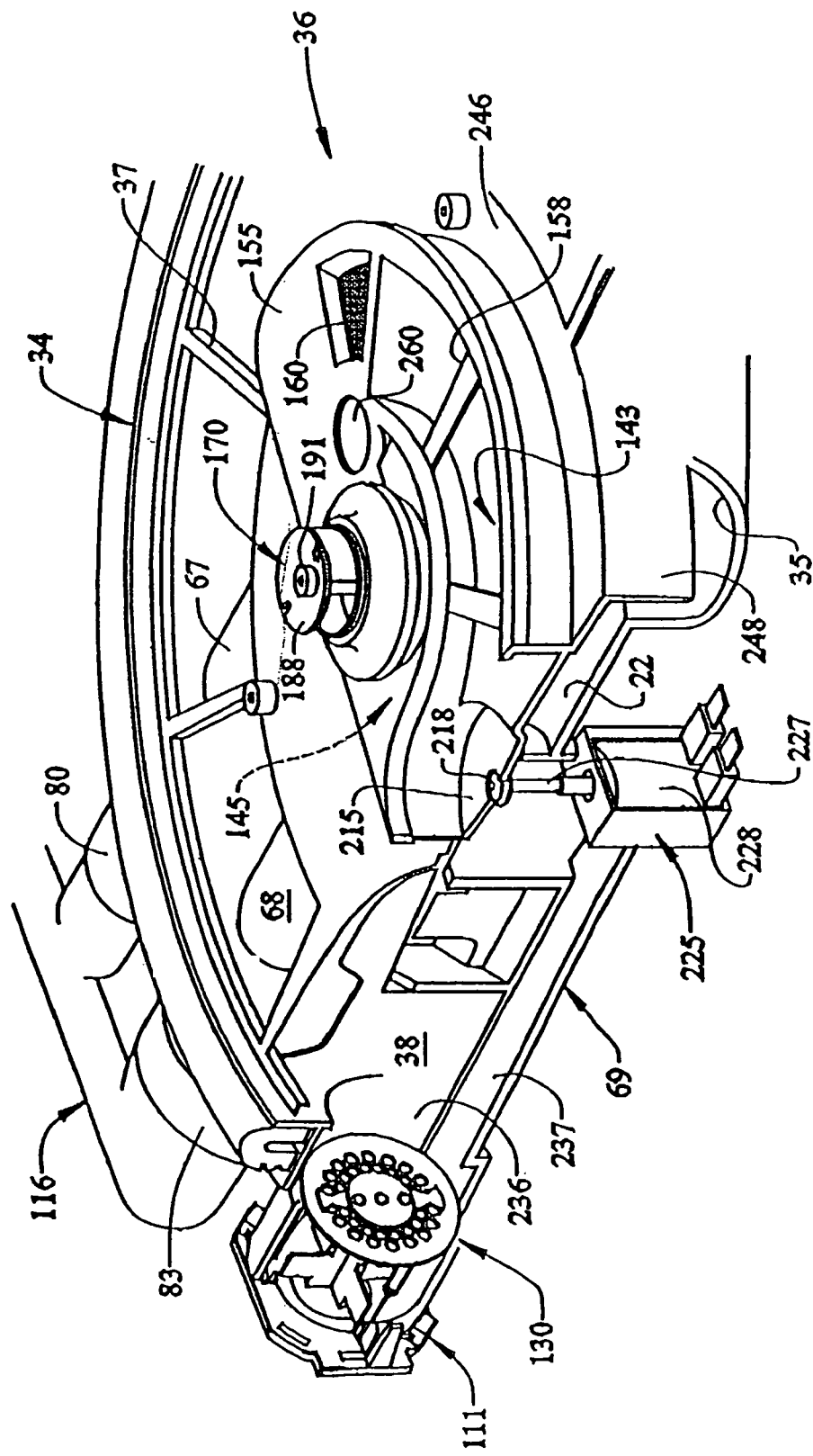
FIG. 6 is a partial, cross-sectional view of a bottom wall portion of the washing tub illustrating a valve sealing a fine particle collection chamber portion employed in connection with the overall invention.
Figure 7:
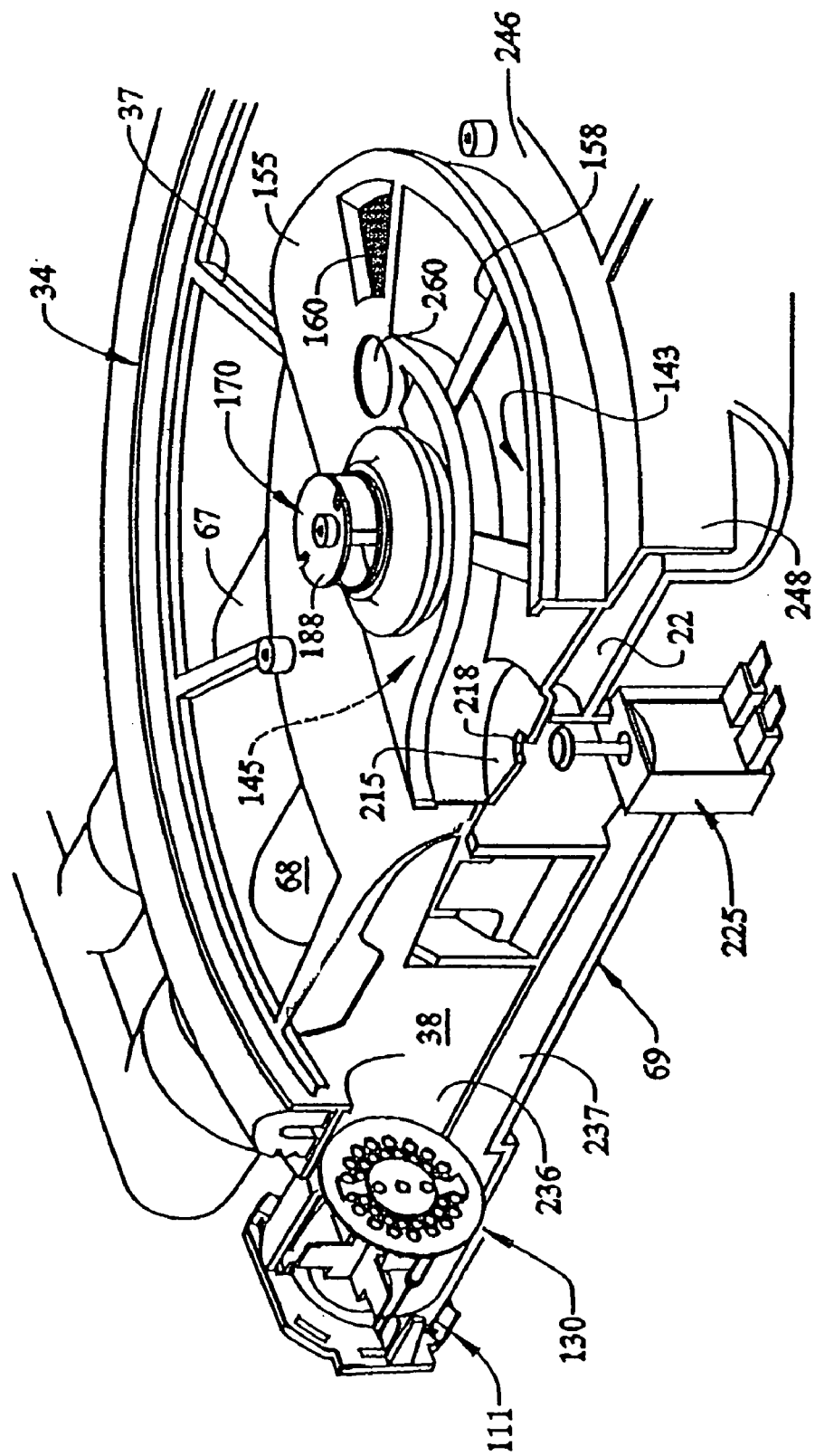
FIG. 7 is a partial, cross-sectional view of a bottom wall portion of the washing tub of FIG. 6 illustrating the valve open position wherein fine soil particles are guided to a drain pump.

In addition to managing the flow of washing fluid in dishwasher 2, sump 33 serves as a mounting platform for a plurality of wash system components. As best shown in FIG. 3, a wash pump 110 and a drain pump 111 are mounted to washing tub 28 along outer edge portion 74. Preferably, wash pump 110 includes a wash motor housing 115 and a wash pump housing 116. More preferably, wash pump housing 116 includes a supply outlet 119 and a recirculation inlet 120 that conducts wash fluid back from washing tub 28 to pump housing 116. Toward that end, wash pump housing 116 is generally F-shaped, with supply outlet 119 and recirculation outlet 120 projecting into attachment flanges 80 and 83 of supply and recirculation conduits 67 and 68 respectively. In the embodiment shown, a heater element 122 is positioned within recirculation conduit 68 to heat the washing fluid that is circulating into and out of washing tub 28. With this arrangement, a substantially closed loop recirculation system is formed within washing tub 28. Likewise, drain pump 111 includes a drain motor housing 123 and a drain pump housing 124. Drain pump housing 124 includes an inlet port (not shown) and an outlet port 126 adapted to be interconnected to a drain hose (not shown). The inlet port is preferably provided with a chopping mechanism 130, as best represented in FIGS. 6 and 7, for macerating food particles before being expelled with the washing fluid from washing tub 28 during periodic drain or purging operations.

Referring to FIGS. 2 and 4-7, dishwasher 2 includes a filter assembly 140 arranged centrally within coarse particle strainer 36. In accordance with the preferred form of the invention, filter assembly 140 is actually divided into a filter chamber 143 and a washing fluid manifold 145. Washing fluid manifold 145 is configured to receive a flow of washing fluid from wash pump 110 through an inlet portion 148 and thereafter direct or guide the washing fluid through a passage 149 to an upward into washing tub 28. As will be discussed more fully below, washing fluid manifold 145 is provided with a sampling port 153 that diverts a portion of the washing fluid flowing through passage 149 into filter chamber 143.

Filter assembly 140 includes a cover member 155 having a plurality of large openings, one of which is indicated at 158. Preferably, cover member 155 is secured in place through a plurality of fasteners (not shown) that extend through a plurality of mounting bosses 159. In the embodiment shown, openings 158 are provided with a fine mesh filtering screen, which is partially shown at 160, for entrapping soil from the washing fluid in filter chamber 143, while permitting cleansed washing fluid to be directed back upward into washing tub 28. Therefore, openings 158 are provided solely over filter chamber 143 of filter assembly 140. In addition, cover member 155 is provided with a central opening 162 including an annular lip 163 (FIG. 5) that defines a recessed flange 164. As will be detailed more fully below, central opening 162 provides a passage for a stationary hub member 170 (FIGS. 6 and 7) that extends upward beyond cover member 155 into washing tub 28.

Figure 5:
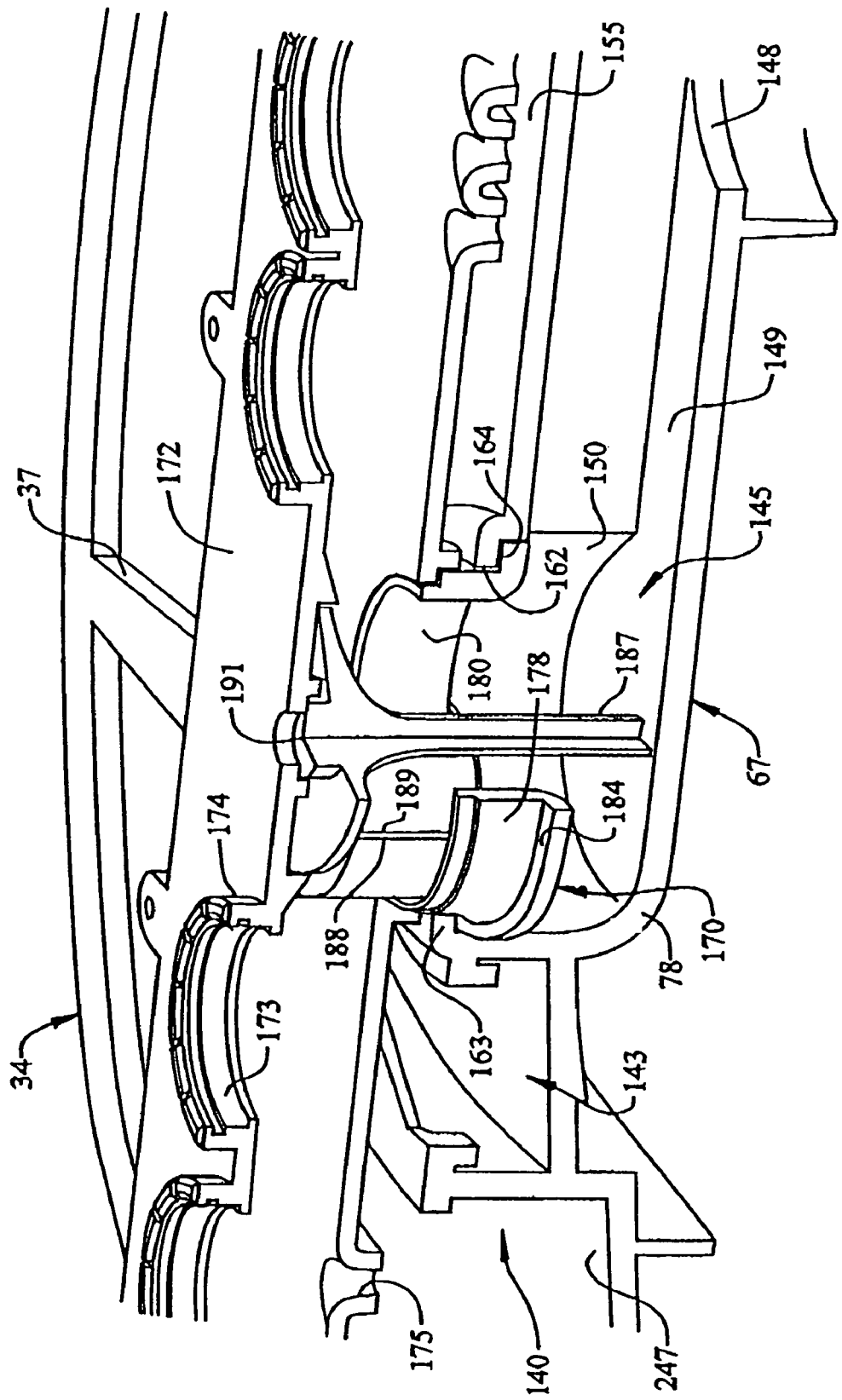
FIG. 5 is an enlarged view of a portion of FIG. 4.

As best shown in FIG. 5, stationary hub member 170 is adapted to rotatably support a wash arm 172 that directs jets of water onto kitchenware and the like arranged upon dish rack 30. In the embodiment shown, wash arm 172 includes a plurality of upwardly projecting openings 173, each of which includes a corresponding upstanding annular flange 174. Flange 174 is adapted to snap-fittingly receive an adjustable jet cap (not shown) that can be oriented, either at the factory or by a consumer, to obtain an optimal water spray in washing tub 28. In addition to upwardly projecting openings 173, wash arm 172 is provided with a plurality of downwardly projecting openings 175 that are directed onto mesh screen 160. In any event, stationary hub member 170 includes an outer surface 178 that defines a central passage or conduit 180 that guides washing fluid from washing fluid manifold 145 up into wash arm 172. In addition, extending about outer surface 178 is a sealing surface 184 that abuts cover member 155 to provide a seal about stationary hub 170. Actually, sealing surface 184 is forced against recessed flange 164 of central opening 159 in the presence of a flow of washing fluid to establish the seal. This particular configuration limits pressure losses to increase washing efficiency. Stationary hub member 170 includes a central shaft 187 that, when in position, abuts against a bottom portion (not separately labeled) of washing fluid manifold 145. Shaft 187 causes an upper portion 188 of stationary hub 170 to project above cover member 155. In this manner, stationary hub 170 is properly positioned to facilitate the assembly of wash arm 172. In the embodiment shown, upper portion 188 is provided with an outlet 189 that opens into wash arm 172. Arranged centrally on upper portion 188 is an attachment lug 191 provided to rotatably support wash arm 172 above stationary hub 170.

As outlined above, a portion of the washing fluid that is directed into wash arm 172 is diverted into filter chamber 143 through sampling port 153. Soil particles too large to pass through filtering screen 160 are trapped within filter chamber 143 and, ultimately, collect into a fine particle collection chamber 215 (FIGS. 6 and 7). Fine particle collection chamber 215 is provided with an opening 218 that leads into drain passage 69. Opening 218 is provided with a valve 225 that, during select portions of a washing operation, opens to allow the soil particles collected within fine particle collection chamber 215 to pass into drain passage 69. Preferably, valve 225 is constituted by an electrically activated solenoid-type valve that, upon activation, causes a plunger 227 to be drawn into a valve body 228, thus allowing passage through opening 218. Actually, in accordance with the most preferred form of the present invention, drain passage 69 constitutes a bifurcated drain passage having a coarse particle portion 236 and a fine particle portion 237. Thus, as best shown in FIGS. 6 and 7, large soil particles flowing into intake ring 35 travel with the washing fluid and ultimately collect within coarse particle collection chamber 38. The coarse particles are withdrawn from dishwasher 2 during various drain/purge operations performed by drain pump 111. In addition, fine soil particles collecting within fine soil particle collection chamber 215 are withdrawn from filter chamber 143 during the various drain/purge operations concurrently with coarse soil particles from coarse soil particle collection chamber 38. Alternatively, in the event that filter screen 160 becomes clogged, valve 225 can open, as shown in FIG. 7, allowing the passage of soil into fine particle conduit 237 in order to prevent an excessive pressure build-up within fine soil filter chamber 143. With this particular arrangement, a multi-size particle collection system can be incorporated into dishwasher 2 without allowing fine soil particles and coarse soil particles to intermix prior to draining.

With particular reference to FIG. 4, filter assembly 140 includes a flow plate 246 over which passes fluid leading from washing tub 28 and filter chamber 143 back into intake ring 35 to be recirculated with the washing fluid. Flow plate 246 includes an annular plateau 247 that leads to a downwardly projecting lip 248 which extends into intake ring 35. In addition, interposed between coarse particle strainer 36 and flow plate 246 is an annular filter ring 249 that prevents large objects from entering into, and possibly clogging, intake ring 35. Annular filter ring 249 rests within a notch 250 defined by an inner perimeter of coarse particle strainer 36. Annular filter ring 249 extends through an angled portion 251 that includes a plurality of openings 252 and abuts annular plateau 247. In still further accordance with the present invention, filter assembly 140 includes a bleed valve 260 (FIGS. 6 and 7) that enables air trapped within lower portions of sump 33 during an initial fill portion of the washing operation to pass up into washing tub 28. More specifically, as washing fluid enters washing tub 28, sump 33 and fluid conduits 67-69, air may become trapped within various regions of filter assembly 140 and sump 33. Thus, during an initial operation of wash pump 110 to recirculate washing fluid in washing tub 28, air may be ingested into wash pump 110 causing cavitation or hesitation of wash pump 110. In order to prevent this particular problem, as washing fluid is being introduced into washing tub 28, air being displaced by the washing fluid is allowed to pass upward through bleed valve 260 and escape into washing tub 28 so as to purge any trapped air from within filter assembly 140 and sump 33. In this manner, the overall performance of dishwasher 2 can be enhanced with particular focus being upon noise reduction and increasing pump life.

In any event, the particular construction and arrangement of filter assembly 140 contributes to forming a washing tub 28 with minimal vertical height, without sacrificing washing operation performance. In other words, sump 33 and filter assembly 140 of the present invention enables the construction of drawer-type dishwasher 2 that includes many of the advantageous features of larger dishwashers, such as multi-stage filtering, wash fluid flow management, food choppers and the like without increasing an overall vertical height of dishwasher 2. In addition, the construction of sump 33 simplifies the overall assembling process for dishwasher 2. Furthermore, washing tub 28 can be provided with a turbidity sensor 300 (FIG. 3) to control advantageous washing operations, particularly unscheduled drain or purging operations. In general, the structure described above is provided for the sake of completeness and the present invention is particularly directed to a system for reducing pressure in filter chamber 143.

Figure 8:
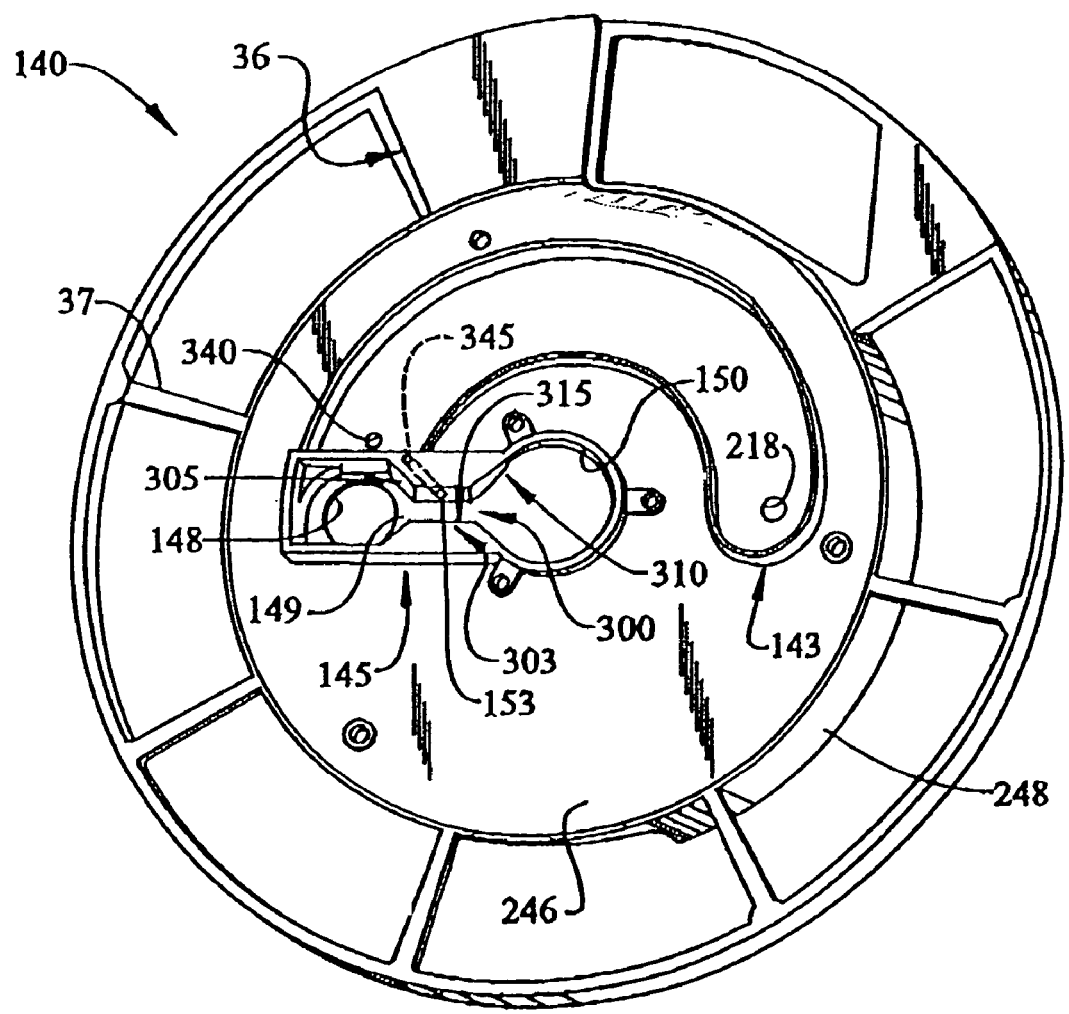
FIG. 8 is a partial perspective view of a flow plate portion of the pump and filter system constructed in accordance with a first embodiment of the present invention.

In accordance with a preferred embodiment of the invention as shown in FIG. 8, washing fluid manifold 145 includes a flow restrictor 300 arranged within passage 149. Flow restrictor 300 functions to create a low pressure zone or region in washing fluid manifold 145. More specifically, the flow of washing fluid entering inlet portion 148 initially enters passage 149 at a first pressure and at a first velocity. Flow restricter 300 is preferably constituted by a venturi, as generally indicated at 303. As shown, venturi 303 includes a first tapered portion 305 exposed to inlet portion 148 of washing fluid manifold 145. First tapered portion 305 leads to a second tapered portion 310 through a narrow, throat section 315. With this construction, the pressure of the washing fluid entering throat section 315 is reduced while, at the same time, the washing fluid flow experiences an increase in velocity. The increase in velocity of the washing fluid enables proper operation of, for example, wash arm 172, while the low pressure ensures efficient operation of filter assembly 140. In the most preferred form of the invention, sampling port 153 is located in the low pressure region of washing fluid manifold 145 and, most preferably, within flow restrictor 300. That is, in order to ensure that filter chamber 143 is supplied with washing fluid at a low pressure, sampling port 153 is preferably located within throat section 315.

In still further accordance with the invention, in order to supplement the pressure reduction accomplished by passing the washing fluid through venturi 303, filter chamber 143 is provided with a bleed port 340. As shown, bleed port 340 is located in a bottom wall (not separately labeled) of filter chamber 143. In order to prevent soil from being released into washing tub 28, bleed port 340 is preferably positioned directly adjacent to an inlet 345 to filter chamber 143 from sampling port 153. In accordance with the invention, bleed port 340 is defined by a first cross-sectional area, inlet 345 is defined by a second cross-sectional area, and sampling port 153 is defined by a third cross-sectional area. In the most preferred form of the present embodiment, the cross-sectional area of sampling port 153 is sized so as to be less than the combined cross-sectional areas of bleed port 340 and inlet 345. In this manner, washing fluid entering filter chamber 143 can be maintained at a low pressure to further ensure efficient filtration and removal of soil particles from the washing fluid prior to re-entering washing tub 28.

Figure 9:
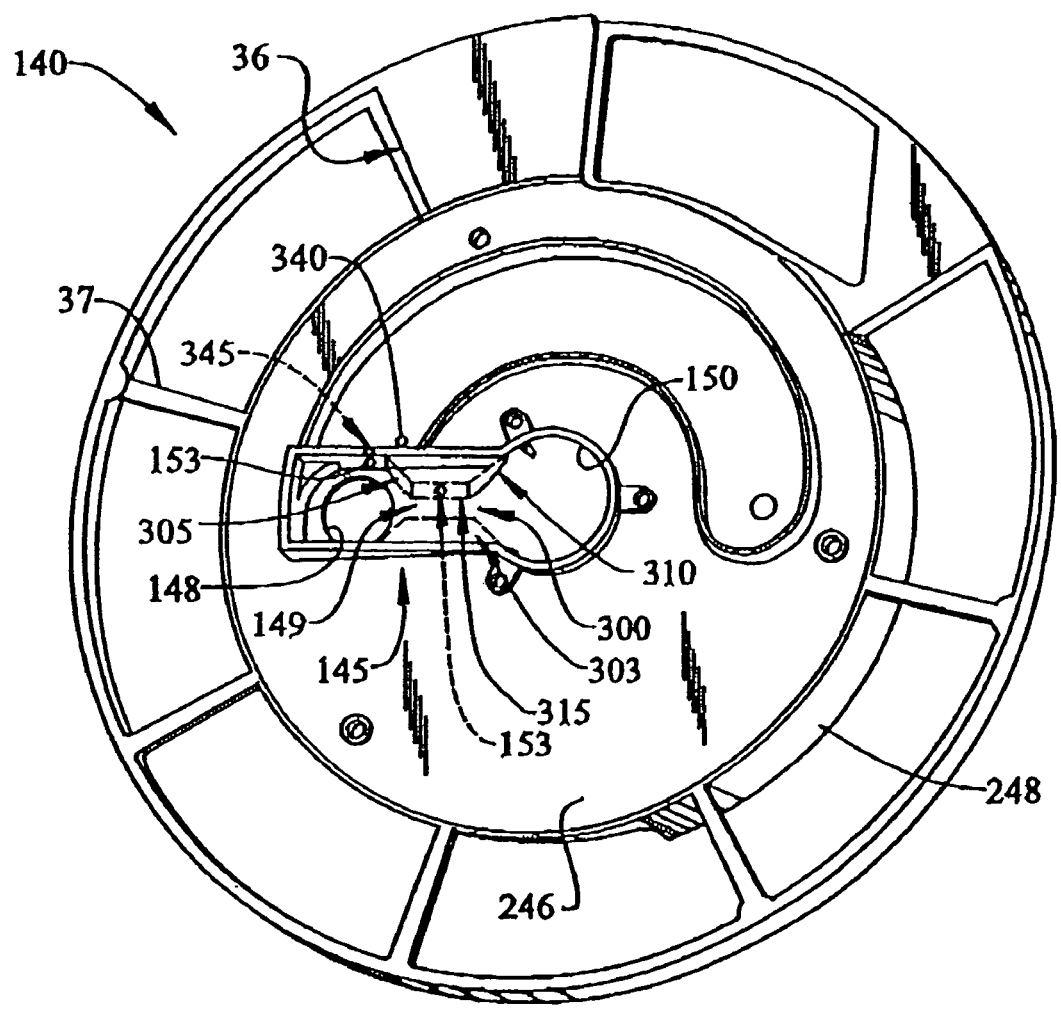
FIG. 9 is a partial, perspective view of a flow plate portion of the pump and filter system constructed in accordance with a second embodiment of the present invention.

FIG. 9 is presented to reference certain modifications which can be made in accordance with the invention. More particularly, the embodiment of FIG. 8 sets forth the combination of sampling port 153 located in throat section 315, venturi 303 and bleed port 340. However, it should be initially noted that sampling port 153 can be repositioned in accordance with the invention. FIG. 9 illustrates an embodiment wherein sampling port 153 is located closely adjacent to inlet portion 148, rather than in throat section 315. FIG. 9 also illustrates a potential modification wherein venturi 303 is not employed. That is, the flow for filtering and spraying purposes could be established through only the use of sampling port 153 and bleed port 340. In addition, it should be noted that the combination of sampling port 153 and venturi 303 could be utilized without the inclusion of bleed port 340. Regardless, the most preferred embodiment of the invention incorporates each of sampling port 153, venturi 303 and bleed port 340. However, although described with reference to preferred embodiments of the invention, it should be readily apparent to one of ordinary skill in the art that various changes and/or modifications can be made to the invention without departing from the spirit thereof. In general, the invention is only intended to be limited to by the scope of the following claims.

We claim:

1. A dishwasher comprising:
    a tub including rear, bottom and opposing side walls that collectively define a wash chamber,
    a wash pump for establishing a flow of washing fluid in the wash chamber;
    a drain pump for selectively withdrawing washing fluid from the wash chamber during portions of a washing operation;
    a washing fluid manifold including an inlet for receiving the flow of washing fluid, an outlet that directs the flow of washing fluid into the wash chamber and a passage interconnecting the inlet and the outlet;
    a filter chamber fluidly connected to the washing fluid manifold, said filter chamber including an inlet for receiving a portion of the flow of washing fluid and an outlet that leads into the wash chamber;
    a flow restrictor arranged within the passage interconnecting the inlet and the outlet of the washing fluid manifold, said flow restrictor creating a low pressure zone in the passage;
    a sampling port positioned in the low pressure zone, said sampling port being in fluid communication with the inlet of the filter chamber so as to divert the portion of the flow of washing fluid entering the filter chamber at a reduced pressure; and
    a bleed port arranged in the filter chamber to further reduce the pressure of the washing fluid entering the filter chamber, wherein washing fluid entering the filter chamber is maintained at a low pressure so as to ensure proper filtration.

2. A dishwasher comprising:
    a tub including rear, bottom and opposing side walls that collectively define a wash chamber;
    a wash pump for establishing a flow of washing fluid in the wash chamber;
    a drain pump for selectively withdrawing washing fluid from the wash chamber during portions of a washing operation;
    a washing fluid manifold including an inlet for receiving the flow of washing fluid, an outlet that directs the flow of washing fluid into the wash chamber and a passage interconnecting the inlet and the outlet;
    a filter chamber fluidly connected to the washing fluid manifold, said filter chamber including an inlet for receiving a portion of the flow of washing fluid and an outlet the leads into the wash chamber;
    a flow restrictor arranged within the passage interconnecting the inlet and the outlet of the washing fluid manifold, said flow restrictor creating a low pressure zone in the passage; and
    a sampling port positioned in the low pressure zone, said sampling port being in fluid communication with the inlet of the filter chamber so as to divert the portion of the flow of washing fluid entering the filter chamber at a reduced pressure, wherein washing fluid entering the filter chamber is maintained at a low pressure so as to ensure proper filtration.

3. The dishwasher according to claim 2, wherein the flow restrictor constitutes a venturi.

4. The dishwasher according to claim 3, wherein the venturi includes a first tapered portion, a narrow portion and a second tapered portion, said first tapered portion being exposed to the inlet of the washing fluid manifold and said second tapered portion leading to the outlet of the washing fluid manifold.

5. The dishwasher according to claim 4, wherein the sampling port is located in the narrow portion of the venturi.

6. The dishwasher according to claim 2, wherein the flow restrictor is positioned centrally within the passage interconnecting the inlet of the washing fluid manifold with the outlet of the washing fluid manifold.

7. The dishwasher according to claim 2, wherein the dishwasher is constituted by a drawer-type, with the tub constituting a drawer.

8. A dishwasher comprising:
    a tub including rear, bottom and opposing side walls that collectively define a wash chamber;
    a wash pump for establishing a flow of washing fluid in the wash chamber;
    a drain pump for selectively withdrawing washing fluid From the wash chamber during portions of a washing operation;
    a washing fluid manifold including an inlet for receiving the flow of washing fluid, an outlet that directs the flow of washing fluid into the wash chamber and a passage interconnecting the inlet and the outlet;
    a filter chamber fluidly connected to the washing fluid manifold, said filter chamber including an inlet for receiving a portion of the flow of washing fluid and an outlet the leads into the wash chamber;
    a sampling port in fluid communication with the inlet of the filter chamber so as to divert the portion of the flow of washing fluid entering the filter chamber; and
    a bleed port arranged in the filter chamber to reduce the pressure of the washing fluid entering the filter chamber, wherein washing fluid entering the filter chamber is maintained at a low pressure so as to ensure proper filtration.

9. The dishwasher according to claim 8, wherein the bleed port is located in a bottom wall of the filter chamber.

10. The dishwasher according to claim 8, wherein the inlet of the filter chamber is located adjacent the inlet of the washing fluid manifold.

11. The dishwasher according to claim 10, wherein the bleed port is positioned directly adjacent the inlet of the filter chamber.

12. The dishwasher according to claim 8, wherein the bleed port has a first cross-sectional area, the inlet of the filter chamber has a second cross-sectional area and the sampling port has a third cross-sectional area, wherein the third cross-sectional area is less than the first cross-sectional area and the second cross-sectional area combined.

* * * * *

UNITED STATES PATENT AND TRADEMARK OFFICE
CERTIFICATE OF CORRECTION

| | |
|---|---|
| PATENT NO. | : 8,066,821 B2 |
| APPLICATION NO. | : 11/052893 |
| DATED | : November 29, 2011 |
| INVENTOR(S) | : Kristen K. Hedstrom et al. |

It is certified that error appears in the above-identified patent and that said Letters Patent is hereby corrected as shown below:

Col. 7, lines 21-48, Claim 1: "A dishwasher comprising: a tub including rear, bottom and opposing side walls that collectively define a wash chamber, a wash pump for establishing a flow of washing fluid in the wash chamber; a drain pump for selectively withdrawing washing fluid from the wash chamber during portions of a washing operation; a washing fluid manifold including an inlet for receiving the flow of washing fluid, an outlet that directs the flow of washing fluid into the wash chamber and a passage interconnecting the inlet and the outlet; a filter chamber fluidly connected to the washing fluid manifold, said filter chamber including an inlet for receiving a portion of the flow of washing fluid and an outlet that leads into the wash chamber; a flow restrictor arranged within the passage interconnecting the inlet and the outlet of the washing fluid manifold, said flow restrictor creating a low pressure zone in the passage; a sampling port positioned in the low pressure zone, said sampling port being in fluid communication with the inlet of the filter chamber so as to divert the portion of the flow of washing fluid entering the filter chamber at a reduced pressure; and a bleed port arranged in the filter chamber to further reduce the pressure of the washing fluid entering the filter chamber, wherein washing fluid entering the filter chamber is maintained at a low pressure so as to ensure proper filtration." - should be Claim 1: -- A dishwasher comprising: a tub including rear, bottom and opposing side walls that collectively define a wash chamber; a wash pump for establishing a flow of washing fluid in the wash chamber; a drain pump for selectively withdrawing washing fluid from the wash chamber during portions of a washing operation; a washing fluid manifold including an inlet for receiving the flow of washing fluid, an outlet that directs the flow of washing fluid into the wash chamber and a passage interconnecting the inlet and the outlet; a filter chamber fluidly connected to the washing fluid manifold, said filter chamber including an inlet for receiving a portion of the flow of washing fluid and an outlet that leads into the wash chamber; a flow restrictor arranged within the passage interconnecting the inlet and the outlet of the washing fluid manifold, said flow restrictor creating a low pressure zone in the passage; a sampling port positioned in the low pressure zone, said sampling port being in fluid communication with the inlet of the filter chamber so as to divert the portion of the flow of washing fluid entering the filter chamber at a reduced pressure; and a bleed port arranged in the filter chamber to further reduce the pressure of the washing fluid entering the filter chamber, Signed and Sealed this
Twenty-eighth Day of August, 2012

David J. Kappos
*Director of the United States Patent and Trademark Office* wherein washing fluid entering the filter chamber is maintained at a low pressure so as to ensure proper filtration.--

Col. 8, lines 27-49, Claim 8: "A dishwasher comprising: a tub including rear, bottom and opposing side walls that collectively define a wash chamber; a wash pump for establishing a flow of washing fluid in the wash chamber; a drain pump for selectively withdrawing washing fluid From the wash chamber during portions of a washing operation; a washing fluid manifold including an inlet for receiving the flow of washing fluid, an outlet that directs the flow of washing fluid into the wash chamber and a passage interconnecting the inlet and the outlet; a filter chamber fluidly connected to the washing fluid manifold, said filter chamber including an inlet for receiving a portion of the flow of washing fluid and an outlet the leads into the wash chamber; a sampling port in fluid communication with the inlet of the filter chamber so as to divert the portion of the flow of washing fluid entering the filter chamber; and a bleed port arranged in the filter chamber to reduce the pressure of the washing fluid entering the filter chamber, wherein washing fluid entering the filter chamber is maintained at a low pressure so as to ensure proper filtration." - should be Claim 8: -- A dishwasher comprising: a tub including rear, bottom and opposing side walls that collectively define a wash chamber; a wash pump for establishing a flow of washing fluid in the wash chamber; a drain pump for selectively withdrawing washing fluid from the wash chamber during portions of a washing operation; a washing fluid manifold including an inlet for receiving the flow of washing fluid, an outlet that directs the flow of washing fluid into the wash chamber and a passage interconnecting the inlet and the outlet; a filter chamber fluidly connected to the washing fluid manifold, said filter chamber including an inlet for receiving a portion of the flow of washing fluid and an outlet the leads into the wash chamber; a sampling port in fluid communication with the inlet of the filter chamber so as to divert the portion of the flow of washing fluid entering the filter chamber; and a bleed port arranged in the filter chamber to reduce the pressure of the washing fluid entering the filter chamber, wherein washing fluid entering the filter chamber is maintained at a low pressure so as to ensure proper filtration.--